(12) United States Patent
Volpone et al.

(10) Patent No.: US 11,462,854 B2
(45) Date of Patent: Oct. 4, 2022

(54) ELECTRICAL CONNECTOR WITH A MOUNTING FLANGE AND METHOD OF ASSEMBLING SAME

(71) Applicant: Aptiv Technologies Limited, St. Michael (BB)

(72) Inventors: Thomas A. Volpone, Cortland, OH (US); Terry A. George, Salem, OH (US); William C. Lovitz, Niles, OH (US); Eric Haverkate, North Aurora, IL (US)

(73) Assignee: APTIV TECHNOLOGIES LIMITED

( * ) Notice: Subject to any disclaimer, the term of this patent is extended or adjusted under 35 U.S.C. 154(b) by 0 days.

(21) Appl. No.: 17/064,946

(22) Filed: Oct. 7, 2020

(65) Prior Publication Data

US 2021/0143574 A1 May 13, 2021

Related U.S. Application Data

(60) Provisional application No. 62/934,086, filed on Nov. 12, 2019.

(51) Int. Cl.
*H01R 13/59* (2006.01)
*H01R 13/52* (2006.01)
(Continued)

(52) U.S. Cl.
CPC ............ *H01R 13/59* (2013.01); *H01R 13/52* (2013.01); *H01R 13/5219* (2013.01);
(Continued)

(58) Field of Classification Search
CPC .... H01R 13/59; H01R 13/52; H01R 13/5219; H01R 13/73; H01R 13/748; H01R 43/20; H01R 13/623
See application file for complete search history.

(56) References Cited

U.S. PATENT DOCUMENTS

| 8,398,419 B2 | 3/2013 | Coyle et al. |
| 2007/0025866 A1 | 2/2007 | Douyama et al. |
| 2014/0106619 A1* | 4/2014 | Okamoto ........... H01R 13/6581 439/607.58 |

FOREIGN PATENT DOCUMENTS

| DE | 202006018042.7 U1 | 5/2007 |
| EP | 0709926 A1 | 5/1996 |
| WO | 02055355 A2 | 7/2002 |

OTHER PUBLICATIONS

Extended European Search Report for EP Application No. 20206890.4, dated Oct. 3, 2021, 5 pages.

* cited by examiner

*Primary Examiner* — Abdullah A Riyami
*Assistant Examiner* — Justin M Kratt
(74) *Attorney, Agent, or Firm* — Billion & Armitage

(57) ABSTRACT

An electrical connector including a mounting flange defining a mounting hole extending therethrough that is configured to receive a threaded fastener and a deformable crush rib extending from the mount flange and surrounding the mounting hole is presented herein. A method of assembling an electrical connector to a panel including the steps of inserting a fastener within a mounting hole of a mounting flange defining the mounting hole extending therethrough and a crush rib surrounding the mounting hole, applying a clamping force to the mounting flange via the fastener, and deforming the crush rib via the clamping force applied by the fastener such that the deformed crush rib at least partially fills a gap between an inner wall of the mounting hole and the fastener is also presented herein.

17 Claims, 3 Drawing Sheets

(51) Int. Cl.
*H01R 13/73* (2006.01)
*H01R 13/74* (2006.01)
*H01R 43/20* (2006.01)
H01R 13/623 (2006.01)

(52) U.S. Cl.
CPC ........... *H01R 13/73* (2013.01); *H01R 13/748* (2013.01); *H01R 43/20* (2013.01); *H01R 13/623* (2013.01)

ELECTRICAL CONNECTOR WITH A MOUNTING FLANGE AND METHOD OF ASSEMBLING SAME

CROSS-REFERENCE TO RELATED APPLICATION

This application claims the benefit of priority to U.S. Provisional Patent Application No. 62/934,086, filed Nov. 12, 2019, the entire disclosure of which is hereby incorporated herein by reference.

TECHNICAL FIELD OF THE INVENTION

The invention generally relates to electrical connectors d more particularly to an electrical connector having a mounting flange.

BACKGROUND OF THE INVENTION

An electrical connector 10 with mounting flanges 12 as shown in FIGS. 1A through 1C is typically used to mount an electrical connector to a panel having an aperture through which the electrical connection is made. Electrical connectors with mounting flanges typically use metal bushings 14, e.g. aluminum or brass bushings, that surround the mounting holes 16 as compression limiters to prevent fasteners from damaging the mounting flange 12, which is typically formed of a polymeric material, due to over-torqueing of a fastener and causing an excessive clamp load on the flange 12. These metal bushings 14 protect the flange from damage caused by the clamp loads of the fasteners. However, the metal bushings 14 provide a path for intrusion of environmental contaminants, e.g. water or other fluids, into the electrical connector 10 when used with inferior fasteners or with split washers as used in some applications. These metal bushings 14 also typically account for 30% of the cost of the electrical connector 10.

Accordingly, there remains a need for providing an electrical connector with a mounting flange that inhibits intrusion of environmental contaminants into the electrical connector at a lower cost.

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

According to one or more aspects of the present disclosure, an electrical connector includes a mounting flange defining a mounting hole extending therethrough that is configured to receive a threaded fastener and a deformable crush rib extending from the mounting flange and surrounding the mounting hole.

In one or more embodiments of the electrical connector according to the previous paragraph, the crush rib may be angled such that a height of the crush rib decreases as the radial distance from the mounting hole increases.

In one or more embodiments of the electrical connector according to any one of the previous paragraphs, the crush rib may define an annular lip having a semicircular cross section located proximate the mounting hole.

In one or more embodiments of the electrical connector according to any one of the previous paragraphs, a cylindrical boss may surround the mounting hole and the crush rib may extend from the boss.

In one or more embodiments of the electrical connector according to any one of the previous paragraphs, the crush rib may be integrally formed with the boss.

In one or more embodiments of the electrical connector according to any one of the previous paragraphs, the crush rib and the boss may be formed of the same dielectric polymeric material.

In one or more embodiments of the electrical connector according to any one of the previous paragraphs, the crush rib may be integrally formed with the mounting flange.

In one or more embodiments of the electrical connector according to any one of the previous paragraphs, the crush rib and the mounting flange may be formed of the same dielectric polymeric material.

According to one or more aspects of the present disclosure, method of assembling an electrical connector to a panel includes the steps of inserting a fastener within a mounting hole of a mounting flange defining the mounting hole extending therethrough and a crush rib surrounding the mounting hole, applying a clamping force to the mounting flange via the fastener, and deforming the crush rib via the clamping force applied by the fastener such that the deformed crush rib at least partially fills a gap between an inner wall of the mounting hole and the fastener.

In one or more embodiments of the method according to the previous paragraph, the fastener may be a threaded fastener and the deformed crush rib may at least partially fill a thread of the threaded fastener.

In one or more embodiments of the method according to any one of the previous paragraphs, the clamping force may be applied by rotating the threaded fastener.

In one or more embodiments of the method according to any one of the previous paragraphs, the crush rib may be angled such that a height of the crush rib decreases as the radial distance from the mounting hole increases.

In one or more embodiments of the method according to any one of the previous paragraphs, the crush rib defines an annular lip having a semicircular cross section located proximate the mounting hole.

In one or more embodiments of the method according to any one of the previous paragraphs, a cylindrical boss may surround the mounting hole and the crush rib may extend from the boss.

In one or more embodiments of the method according to any one of the previous paragraphs, the crush rib may be integrally formed with the mounting flange and the crush rib and the mounting flange may be formed of the same dielectric polymeric material.

According to one or more aspects of the present disclosure, an electrical connector includes a mounting flange defining a mounting hole extending therethrough that is configured to receive a threaded fastener and means for at least partially filling a gap between an inner wall of the mounting hole and the fastener integral. The means is integral to the mounting flange.

In one or more embodiments of the electrical connector according to the previous paragraph, a cylindrical boss may surround the mounting hole and the means may be disposed upon the boss.

In one or more embodiments of the electrical connector according to any one of the previous paragraphs, the means and the boss may be formed of the same dielectric polymeric material.

In one or more embodiments of the electrical connector according to any one of the previous paragraphs, the means and the mounting flange may be formed of the same dielectric polymeric material.

In one or more embodiments of the electrical connector according to any one of the previous paragraphs, the electrical connector may further include means for at least partially filling a thread of the threaded fastener. The means may be integral to the mounting flange.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Figure 1A:
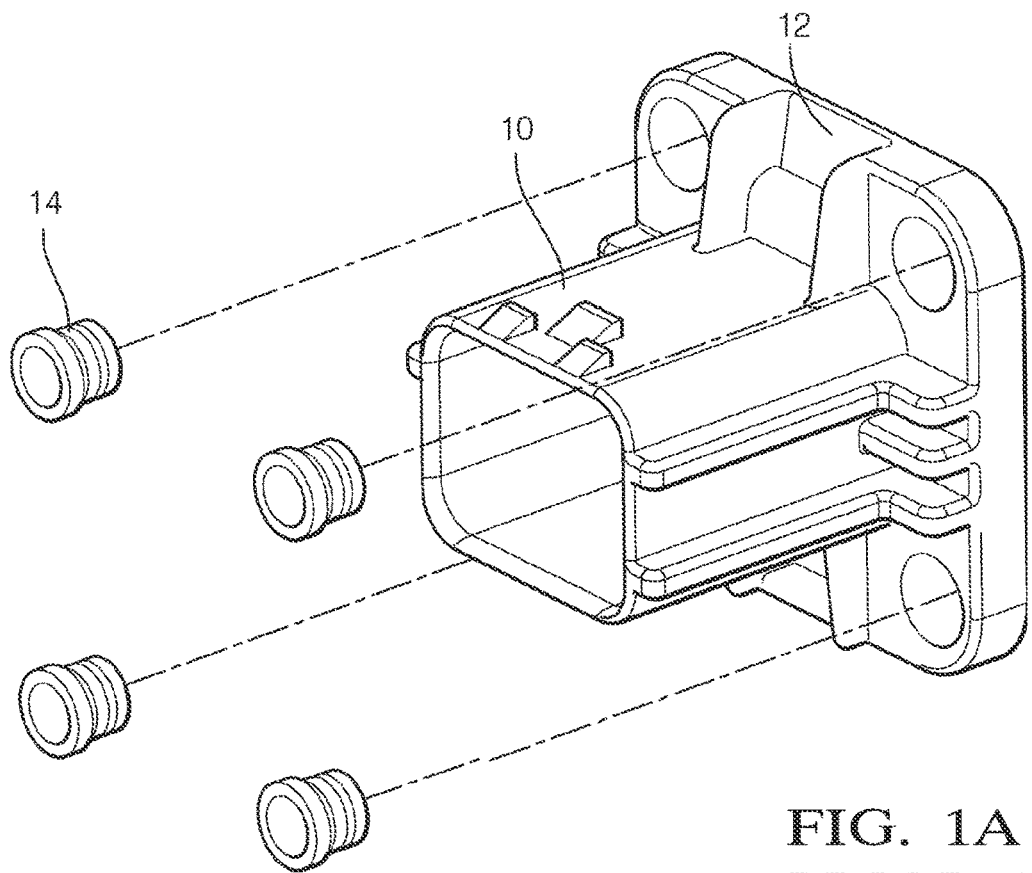
FIG. 1A is an exploded perspective view of an electrical connector with a mounting flange and metal bushings in accordance with the prior art.
Figure 1B:
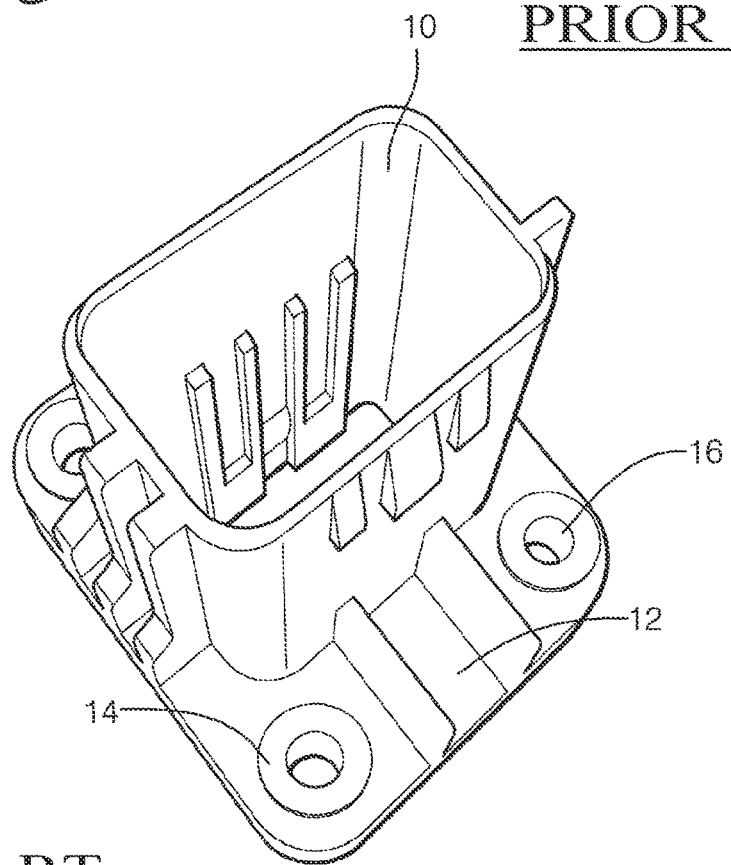
FIG. 1B is a perspective front view of the electrical connector of FIG. 1 in accordance with the prior art.
Figure 2A:
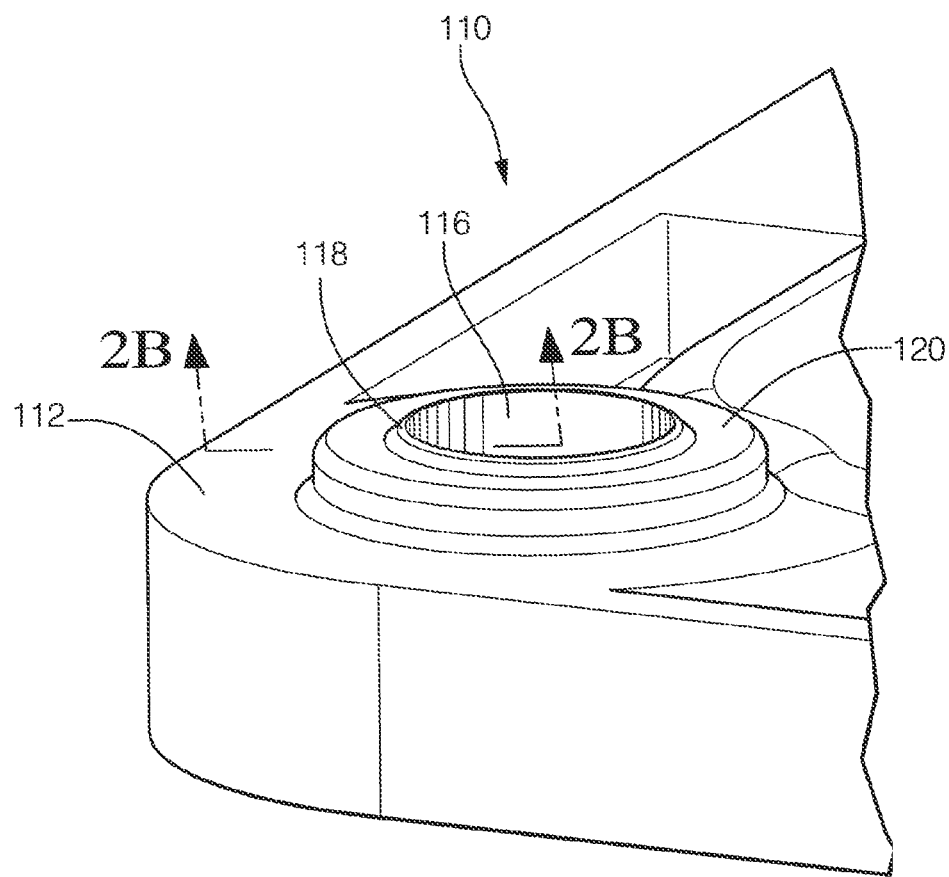
FIG. 2A is a close-up view of a mounting hole in a mounting flange of an electrical connector having a crush rib surrounding the mounting hole in accordance with some embodiments of the invention.
Figure 2B:
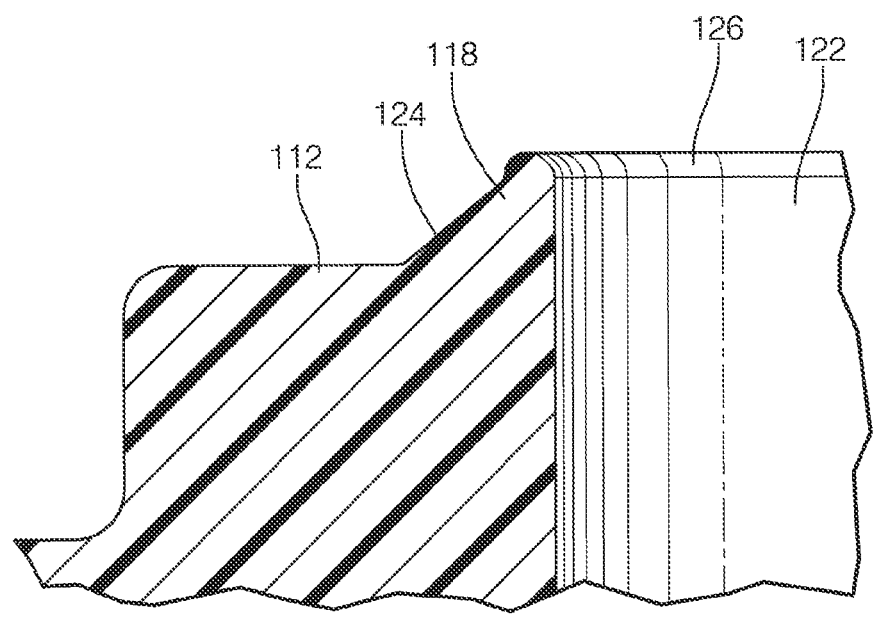
FIG. 2B is a cross section view of the mounting hole and crush rib of FIG. 2A in accordance with some embodiments of the invention.

An electrical connector, hereinafter referred to as the connector 110 with a mounting flange, hereinafter referred to as the flange 112, that is similar to the connector 10 of FIGS. 1A and 1B is presented herein. However, as shown in FIGS. 2A and 2B, the connector 110 has a mounting hole 116 extending through the flange 112 is surrounded by an angled annular crush rib 118, rather than having a metal bushing that surrounds the mounting holes as shown in FIG. 1B. The crush rib 118 sits atop an annular reinforcing boss 120 having a thickness greater than the mounting flange 112 that is designed to withstand a clamping force applied to the flange 112 by a fastener (not shown), e.g. a threaded socket head bolt, securing the connector 110 to a panel (not shown) without damage to the flange 112. The boss 120 and the crush rib 118 are integrally formed with the flange 112 and are formed of the same material as the flange 112, e.g. an engineered dielectric polymeric material such as polyamide (NYLON), polybutylene terephthalate (PBT), or acrylonitrile butadiene styrene(ABS).

This crush rib 118 is located on a side of the flange 112 such that the crush rib 118 is disposed between the flange 112 and the head of the fastener when the connector 110 is attached to a panel. The crush rib 118 is configured to plastically deform when the clamping force is applied to it by the fastener so that the crush rib 118 deforms toward the mounting hole 116 and partially fills the mounting hole 116, preferably filling a gap between a wall 122 of the mounting hole 116 and the fastener. In the case when the fastener is a threaded fastener, the crush rib may also partially fill the threads of the threaded fastener and the friction caused by the interface between the crush rib 118 and the threads will increase the torque necessary to remove the threaded fastener from the mounting hole 116. The crush rib 118 will thereby function similarly to a polymer-insert lock nut to inhibit undesired loosing of the fastener in the mounting hole 116.

The clamping force applied to deform the crush rib may be in the range of 1.25 N to 2.5 N, e.g. resulting from a torque of 1 N-m to 2 N-m applied to a 4 mm treaded fastener. Filling the gap between the mounting hole 116 and the fastener also limits radial travel of the fastener in the mounting hole 116 which may reduce vibration of the header. The top surface 124 of the crush rib 118 is angled such that the height of the crush rib 118 decreases as the radial distance from the mounting hole 116 increases as shown in FIG. 2B. The head of the fastener will interface directly with the boss 120 and the crush rib 118. The crush rib 118 also defines an annular lip 126 having a semicircular cross section that is located at the tip of the crush rib 118 proximate the mounting hole 118 and extending from the inner wall 122.

Figure 3:
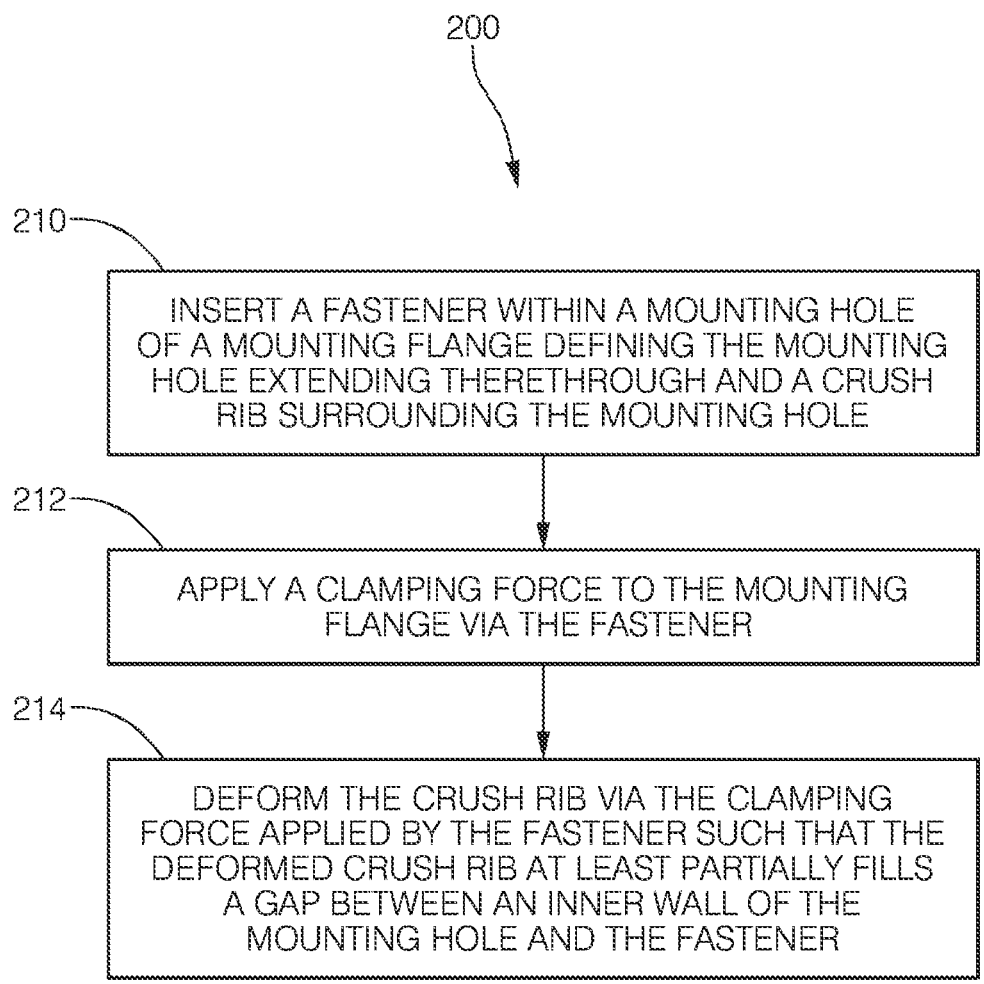
FIG. 3 is a flow chart of a method of assembling an electrical connector to a panel in accordance with some embodiments of the invention.

FIG. 3 illustrates a method 200 of assembling an electrical connector to a panel. The method 200 includes the following steps:

STEP 210, INSERT A FASTENER WITHIN A MOUNTING HOLE OF A MOUNTING FLANGE DEFINING THE MOUNTING HOLE EXTENDING THERETHROUGH AND A CRUSH RIB SURROUNDING THE MOUNTING HOLE, includes inserting a fastener within a mounting hole 116 of a mounting flange 112 defining the mounting hole 116 extending therethrough and a crush rib 118 surrounding the mounting hole 116;

STEP 212, APPLYING A CLAMPING FORCE TO THE MOUNTING FLANGE VIA THE FASTENER, includes applying a clamping force to the mounting flange 112 via the fastener; and STEP 214, DEFORM THE CRUSH RIB VIA THE CLAMPING FORCE APPLIED BY THE FASTENER SUCH THAT THE DEFORMED CRUSH RIB AT LEAST PARTIALLY FILLS A GAP BETWEEN AN INNER WALL OF THE MOUNTING HOLE AND THE FASTENER, includes deforming the crush rib 118 via the clamping force applied by the fastener such that the deformed crush rib 118 at least partially fills a gap between an inner wall 122 of the mounting hole 116 and the fastener.

Accordingly, an electrical connector 110 with a mounting flange 112 having a crush rib 118 and a method 200 of assembling an electrical connector to a panel is provided. The crush rib 118 allows the elimination of metal bushings which provides a significant cost savings for the electrical connector. The crush rib 118 fills the gap between fastener and mounting hole 116 and inhibits radial movement between the fastener and the wall 122 of the mounting hole 116, which reduces undesirable movement between them caused by radial loads, thereby improving vibration performance of the connector 110. Also, by filling the gap between fastener and mounting hole 116 reduces the environmental contaminant path through the mounting hole is reduced, the need for a split washer may be eliminated, and use of a thread locking adhesive, e.g. LOCKTITE 242, may be unnecessary. The crush rib 118 may also serve as an indicator of under torqued or over torqued fasteners based on the degree to which the crush rib 118 is deformed.

While the exemplary embodiment is an electrical connector, other connector embodiments may be envisioned that are adapted for use with fiber optic cables, pneumatic tubes, hydraulic tubes, or a hybrid connector assembly including two or more of the items listed above.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

We claim:

1. An electrical connector, comprising:
   a mounting flange defining a mounting hole extending therethrough that is configured to receive a threaded fastener; and
   a deformable crush rib extending from the mounting flange and surrounding the mounting hole, wherein a cylindrical boss surrounds the mounting hole and wherein the crush rib extends from the boss.

2. The electrical connector in accordance with claim 1, wherein the crush rib is angled such that a height of the crush rib decreases as the radial distance from the mounting hole increases.

3. The electrical connector in accordance with claim 1, wherein the crush rib defines an annular lip having a semicircular cross section located proximate the mounting hole.

4. The electrical connector in accordance with claim 1, wherein the crush rib is integrally formed with the boss.

5. The electrical connector in accordance with claim 4, wherein the crush rib and the boss are formed of the same dielectric polymeric material.

6. The electrical connector in accordance with claim 1, wherein the crush rib is integrally formed with the mounting flange.

7. The electrical connector in accordance with claim 6, wherein the crush rib and the mounting flange are formed of the same dielectric polymeric material.

8. A method of assembling an electrical connector to a panel, comprising:
   inserting a fastener within a mounting hole of a mounting flange defining the mounting hole extending therethrough and a crush rib surrounding the mounting hole;
   applying a clamping force to the mounting flange via the fastener; and
   deforming the crush rib via the clamping force applied by the fastener such that the deformed crush rib at least partially fills a gap between an inner wall of the mounting hole and the fastener, wherein a cylindrical boss surrounds the mounting hole and wherein the crush rib extends from the boss.

9. The method in accordance with claim 8, wherein the fastener is a threaded fastener and wherein the deformed crush rib at least partially fills a thread of the threaded fastener.

10. The method in accordance with claim 9, wherein the clamping force is applied by rotating the threaded fastener.

11. The method in accordance with claim 8, wherein the crush rib is angled such that a height of the crush rib decreases as the radial distance from the mounting hole increases.

12. The method in accordance with claim 8, wherein the crush rib defines an annular lip having a semicircular cross section located proximate the mounting hole.

13. The method in accordance with claim 8, wherein the crush rib is integrally formed with the mounting flange and wherein the crush rib and the mounting flange are formed of the same dielectric polymeric material.

14. An electrical connector, comprising:
   a mounting flange defining a mounting hole extending therethrough that is configured to receive a threaded fastener; and
   means for at least partially filling a gap between an inner wall of the mounting hole and the fastener, the means being integral to the mounting flange, wherein a cylindrical boss surrounds the mounting hole and wherein the means is disposed upon the boss.

15. The electrical connector in accordance with claim 14, wherein the means and the boss are formed of the same dielectric polymeric material.

16. The electrical connector in accordance with claim 14, wherein the means and the mounting flange are formed of the same dielectric polymeric material.

17. The electrical connector in accordance with claim 14, further comprising a means for at least partially filling a thread of the threaded fastener, said means for at least partially filling a thread of the threaded fastener being integral to the mounting flange.

* * * * *